United States Patent [19]

Brissette

[11] Patent Number: 4,575,360
[45] Date of Patent: * Mar. 11, 1986

[54] SLIP TYPE DRIVELINE

[75] Inventor: Ronald N. Brissette, Medina, Ohio

[73] Assignee: Rockwell International Corp., Pittsburgh, Pa.

[*] Notice: The portion of the term of this patent subsequent to Jul. 17, 2001 has been disclaimed.

[21] Appl. No.: 513,946

[22] Filed: Jul. 15, 1983

[51] Int. Cl.$^4$ .......................... F16J 15/32; F16D 3/06; F16D 3/84

[52] U.S. Cl. ..................................... 464/133; 277/12; 277/30; 277/152; 464/162

[58] Field of Search ........................ 277/12, 30, 31, 32, 277/152, 153, 212 R, 212 F, 212 FB; 464/114, 133, 162, 172, 173

[56] References Cited

U.S. PATENT DOCUMENTS

| 2,107,721 | 2/1938 | Swenson | 464/162 X |
|---|---|---|---|
| 2,116,290 | 5/1938 | Spicer | 464/162 |
| 3,123,990 | 3/1964 | Freeman | 464/162 X |
| 3,411,793 | 11/1968 | Jagger et al. | 277/32 |
| 3,942,336 | 3/1976 | Schultenkamper | 464/162 |
| 4,020,651 | 5/1977 | Callies | 464/162 X |
| 4,153,260 | 5/1979 | Joyner | 464/162 X |
| 4,460,182 | 7/1984 | Brissette | 464/162 X |
| 4,460,183 | 7/1984 | Brissette | 464/162 X |

FOREIGN PATENT DOCUMENTS 2314770 11/1973 Fed. Rep. of Germany ...... 464/173

Primary Examiner—Stuart S. Levy
Assistant Examiner—Daniel P. Stodla

[57] ABSTRACT

A slip type driveline assembly with a one piece sealing member to prevent loss and contamination of lubricant. The slip type assembly is generally of a sliding spline design. A spline plug is fitted into a slip yoke with an internal spline that generally mates with the external spline of the spline plug. A tube and weld yoke assembly is generally pressure fit and welded to the spline plug. Universal joint assemblies are attached to each yoke completing the assembly. The splined cavity within the slip yoke generally contains lubricants and is sealed by a plug and a seal which keeps the lubricants in and contaminants out. The sealing member is made of a resilient material and is of one piece construction. The sealing member has a cylindrical wall and integral radially inwardly extending circumferential annulus. The wall and annulus generally complement and mate with the cylindrical end of the slip yoke that has a groove on its surface to receive the annulus.

5 Claims, 8 Drawing Figures

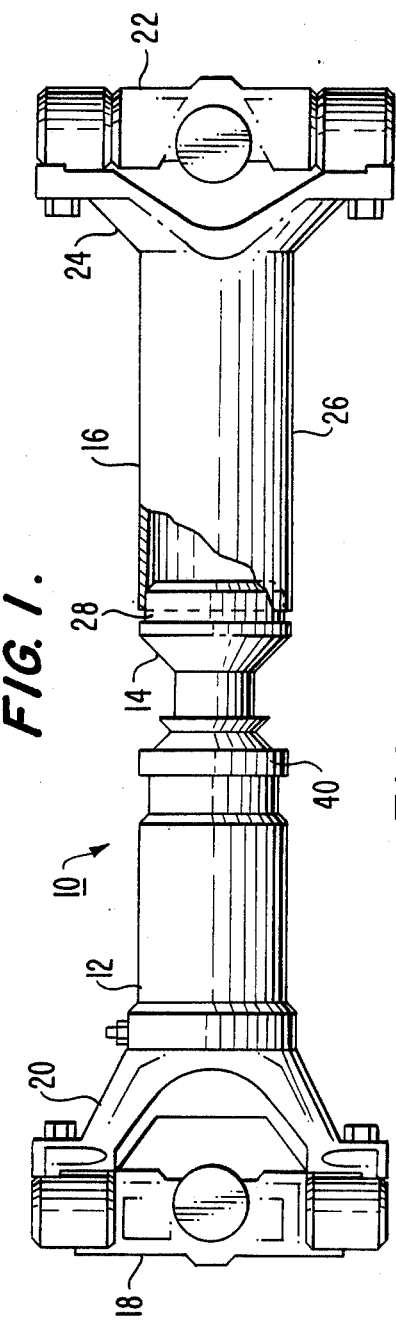
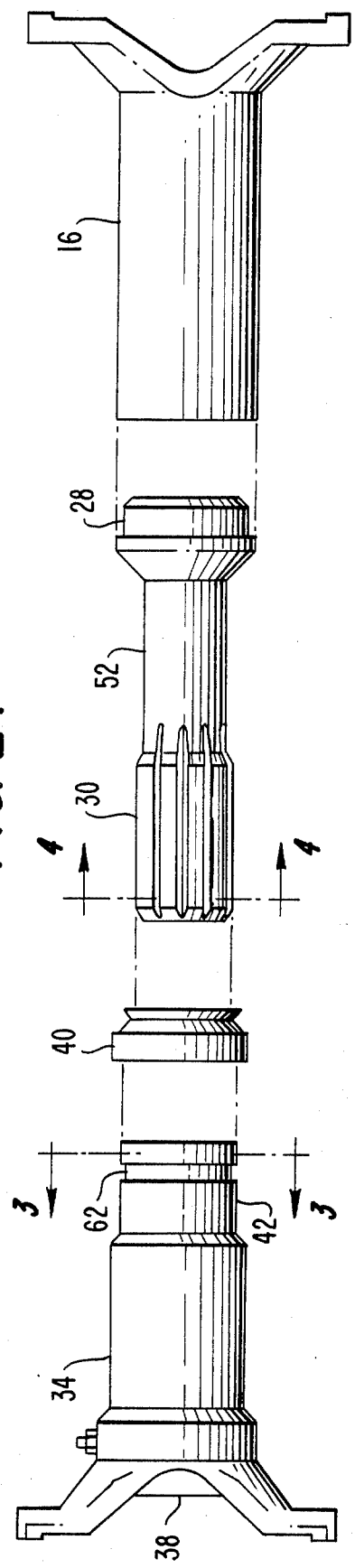
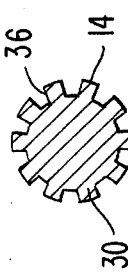
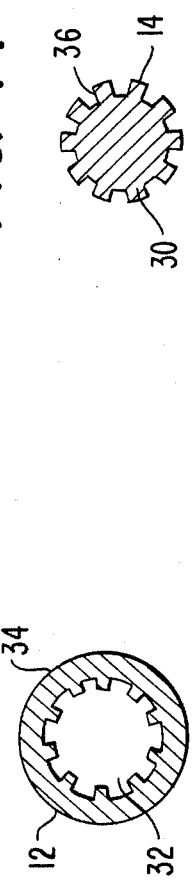

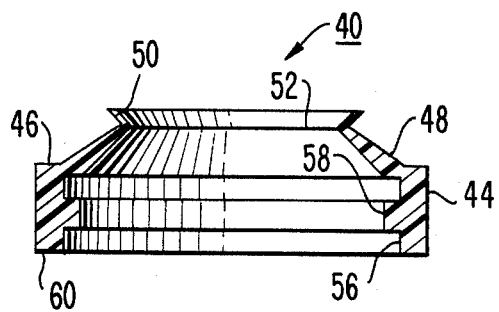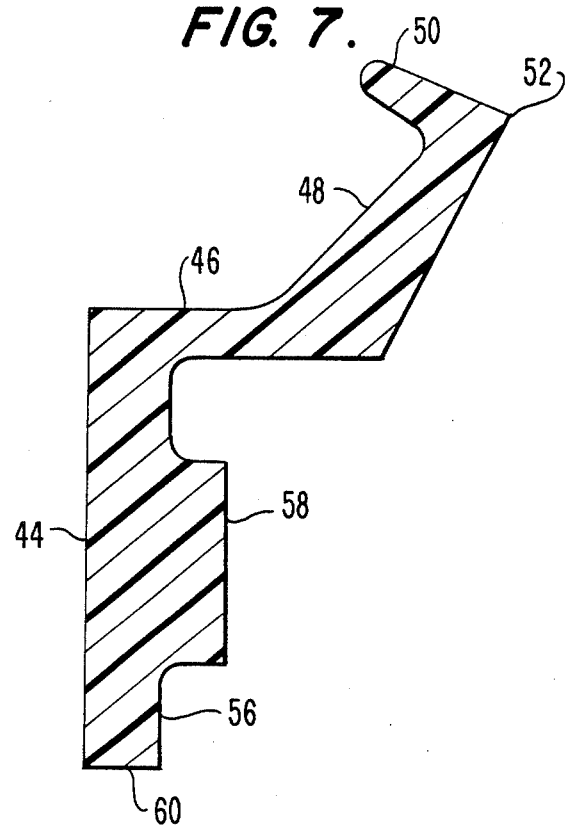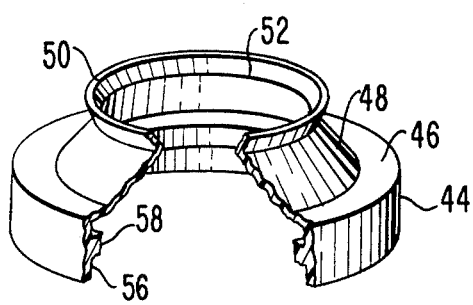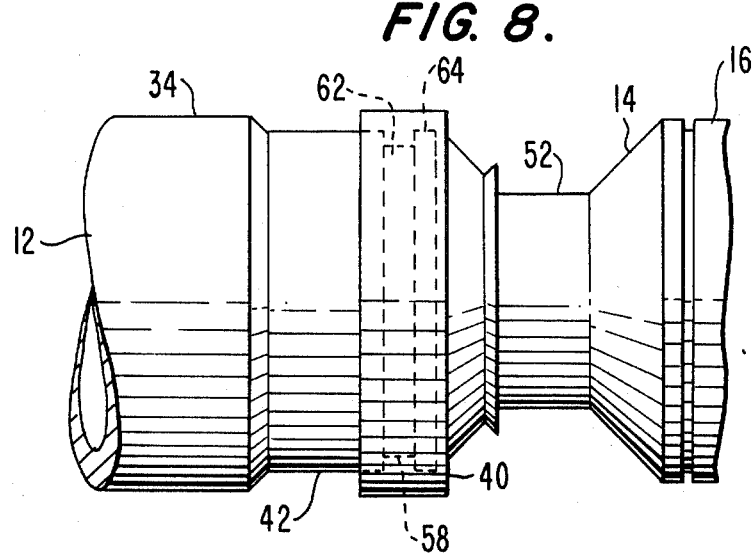

SLIP TYPE DRIVELINE

FIELD OF INVENTION

This invention relates to drivelines and in particular to slip type drivelines with a one piece resilient sealing member.

BACKGROUND OF THE INVENTION

Driveline assemblies are a type of power take off assembly that transfers torque loads from a driving member to a driven member. The driveline assembly usually has a universal joint at each end. The typical cardan type universal joint is basically made up of two yokes each connected to a single center cross with four needle bearings. A fixed driveline assembly is used in applications where the required length of assembly does not vary such as power steering unit. A slip type or telescoping assembly is designed for applications in which the length of the assembly may vary during its normal operation because of application movement or function such as driveline connections between tandem drive axles for truck and tractor applications. Typical inter-axle slip type driveline assemblies can operate up to a 45° angle and can have length variations in excess of 12 inches.

The slip type assembly is generally of a sliding spline design. A spline plug is fitted into a slip yoke with an internal spline that generally mates with the external spline of the spline plug. A tube and weld yoke assembly is generally pressure fit and welded to the spline plug. Universal joint assemblies are attached to each yoke completing the assembly. The splined cavity within the slip yoke generally contains lubricants and is sealed by a plug and a seal which keeps the lubricants in and contaminants out.

The seal is generally one of two types: multi-component or one piece. With multiple-component seals, one or more split washers with internal splines are positioned over the end of the slip yoke and held in place by a threaded metal dust cap. The washer sets are usually of metal and cork or nylon and felt construction. With single piece construction, the dust cap is generally rubber with an internal thread that allows it to be screwed over the end of a slip yoke with matching external threads. The outer surface of the threaded portion of the seal is generally bonded to a metal band that helps maintain the overall seal geometry and prevents thread deformation.

In both arrangements there must be internal threads on the dust seal and corresponding external threads on the slip yoke. These threads on the slip yoke are susceptible to damage in handling and tight controls are required in processing.

SUMMARY OF THE INVENTION

The object of this invention is to provide a slip type driveline assembly with a one piece resilient sealing member.

This and other objects are disclosed in the preferred embodiment which provides a slip type driveline assembly having a first member with a generally circular cross section. The first member has a first end with a means for connecting it to the cross of a universal type joint and a second end having an opening into a cavity within the body of the first member. The cavity has an irregular inner surface. A second member has a first end portion, a central portion, and an enlarged end portion. The first and central portions are slidably received into the cavity of the first member through the second end of the first member. The outer surface of the first end portion of the second member generally complements the irregular inner surface of the cavity of the first member. The central portion has a generally circular cross section with a smooth surface. The enlarged end portion of the second member is provided with a projection to which a first end of a third member is rigidly fixed. A second end of the third member has a means for connecting it to a cross of a universal type joint. The driveline further includes a resilient one piece sealing member and a means for mounting the sealing member at the second end of the first member. The sealing member has a central opening through which the first and central portions of the second member pass through and into the cavity of the first member. The central opening of the sealing member is in intimate contact with the surface of the central portion of the second member so that the intimate contact by the central opening combined with the means for mounting, prevents loss or contamination of lubricant in the cavity of the first member.

In the preferred embodiment, the internal surface of the cavity in the first member is splined and the surface of the first end portion of the second member has a complementing external spline. The one piece sealing member has a cylindrical wall, the inner diameter of which is the same as the outer diameter of the second end of the first member, a radially inwardly extending wall at one end of the cylindrical wall, a radially inwardly converging truncated conical wall joined to the inwardly extending wall, and a radially outwardly extending reinforcing rib joined at the inner end of the truncated conical wall.

Preferably, the means for mounting the sealing member includes a radially inwardly extending circumferential annulus formed on the inner surface of the cylindrical wall of the sealing member and integral therewith. The annulus fits into and generally complements an annular groove near the edge of the second end of the first member.

A preferred slip type driveline assembly has a first hollow tube-like member with an irregular internal surface and a means for connecting a first end of the first member to a universal type joint. The first member also has a seal mounting end oppositely disposed from the first end. A circular shaft member has a first end portion whose surface generally complements a cavity formed by the internal surfaces of the first tube-like member and is slidably received therein. A central portion has a generally circular cross section and smooth external surface. A second end has a cylindrical projection. A second tube-like member has an inner diameter at a first end substantially equal to the outer diameter of the cylindrical projection on the shaft member. The projection is inserted into the first end of the second member and is rigidly attached thereto. The second end of the second member has means for connecting the second end to a universal type joint. A resilient one piece sealing member and means for mounting the sealing member is mounted at the seal mounting end of the first tube-like member. The sealing member has a central opening through which the first end portion and central portion of the shaft member pass through and into the first tube-like member. The central opening of the sealing member is in intimate control with the smooth surface of the central portion of the shaft member so that the intimate contact by the central opening combined with the means for mounting prevents loss or contamination of lubricant within the first tube-like member.

In the preferred embodiment, the internal surface of the first tube-like member is splined and the surface of the first end portion of the shaft member has a complementing external spline. Preferably, the one piece sealing member has a cylindrical wall, the inner diameter of which is the same as the outer diameter of the seal mounting end of the first tube-like member, a radially inwardly extending wall at one end of the cylindrical wall, a radially inwardly projecting truncated conical wall joined to the inwardly extending wall, and a radially outwardly extending reinforcing rib joined at the inner end of the truncated conical wall.

In the preferred driveline, the means for mounting the sealing member at the seal mounting end of the first tube-like member includes a radially inwardly extending circumferential annulus formed on the inner surface of the cylindrical wall of the sealing member and integral therewith. The annulus fits into and generally complements an annular groove located near the edge of the seal mounting end of the first tube-like member.

BRIEF DESCRIPTION OF THE DRAWINGS

FIG. 1 is a plan view of an assembled driveline assembly with a partial cutaway view.

FIG. 2 is an exploded view of a driveline assembly without the universal joint cross connection.

FIG. 3 is an end view of the slip yoke taken through line 3—3 of FIG. 2.

FIG. 4 is an end view of the spline plug taken through line 4—4 of FIG. 2.

FIG. 5 is a cross section of the resilient sealing member.

FIG. 6 is a cutaway isometric view of the resilient sealing member.

FIG. 7 is an enlarged cross section of the resilient sealing member's wall.

FIG. 8 is an enlargement of an assembled slip yoke, sealing member and spline plug.

DESCRIPTION OF THE INVENTION

The preferred driveline assembly 10 as shown in FIG. 1 consists generally of a slip yoke 12, a spline plug 14 and a tube and weld yoke assembly 16. A cross and bearing kit 18 is bolted to yoke 20 of slip yoke 12 and a cross and bearing kit 22 is mounted to yoke 24 of the tube and weld yoke assembly 16. The tubing section 26 of the tube and weld yoke assembly 16 is pressure fit over the cylindrical end 28 of the spline plug 14. The splined end 30 of spline plug 14 is slidably received into the splined cavity 32 of the cylindrical body 34 of slip yoke 12. FIG. 3 shows the internal splined cavity 32 of slip yoke 12 while FIG. 4 shows the corresponding external spline surface 36 of spline plug 14. Lubricant within splined cavity 32 helps the easy movement of spline plug 14 within slip yoke 12. The lubricant is contained within splined cavity 32 by a plug 38 and a sealing member 40. Sealing member 40 fits over the seal mounting end 42 of the cylindrical body 34 of slip yoke 12 and allows spline plug 14 to slide therethrough.

The preferred sealing member 40 is made out of a resilient material, usually neoprene rubber, with a durameter hardness of 60 to 70 and a minimum tensile strength of 2000 psi (140 kg/cm$^2$). The preferred line call-out designation for sealing member 40, as defined in the 1977 *Society of Automotive Engineers Handbook,* "Classification System for Electrometric Materials for Automotive Applications—SAE J200h" is 2BC620A14B14C12E014E034F17G21. Sealing member 40 has a cylindrical wall 44 joined to a radially inwardly extending wall 46. Wall 44 in turn is joined to a radially inwardly converging truncated conical wall 48. Truncated conical wall 48 is tapered to give it additional strength and terminates at a radially outwardly extending reinforcing rib 50. The diameter of the opening formed by edge intersection 52 between truncated conical wall 48 and reinforcing rib 50 is slightly less than the diameter of the unsplined section 54 of spline plug 14. The resulting close contact between edge 52 and unsplined section 54 of the spline plug 14 will generally prevent lubricant from leaking out of the splined cavity 32 in slip yoke 12 and prevent dust from entering.

The inner surface 56 of the cylindrical wall 44 of sealing member 40 has a circumferential annulus 58 that is formed integrally therewith. Annulus 58 is generally centered on inner surface 56 between radially outwardly extending wall 46 and the outer edge 60 of the cylindrical wall 44, although its position can vary along cylindrical wall 44. The inner diameter of cylindrical wall 44 is generally the same as the outer diameter of the seal mounting end 42 of slip yoke 12.

A circumferential groove 62 is cut in cylindrical body 34 of slip yoke 12 at seal mounting end 42. The diameter of the seal mounting end 42 taken at groove 62 is generally equal to the inner diameter of circumferential annulus 58. In addition, the width of the circumferential annulus 58 is generally the same as that of circumferential groove 62. When assembled, the inner surface 56 of sealing member 40 along cylindrical wall 44 generally complements the outside surface 64 of slip yoke 12 at seal mounting end 42. Since circumferential annulus 58 is fitted within circumferential groove 62, the resilient sealing member 40 is prevented from moving axially relative to slip yoke 12, and the lubricant is contained within splined cavity 32.

While the preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the amended claims.

I claim:

1. A slip-type driveline assembly comprising:
   a first member with a generally circular cross section, said first member having a first end with a means for connecting it to a cross of a universal type joint and a second end having an opening to a cavity within the body of said first member, said cavity having a splined surface;
   a second member having a first end portion, a central portion and an enlarged end portion, said first and central portions being slidably received into said cavity of said first member through the second end of said first member, the outer surface of said first end portion of said second member being splined for complementing engagement with the splined inner surface of said cavity of said first member, said central portion having a generally circular cross section with a smooth surface, and said enlarged end portion of said second member being provided with a projection;
   a third member including a first end for rigid attachment to the projection of the enlarged end portion of said second member, and a second end having a means for connecting it to a cross of a universal type joint; and a resilient one-piece sealing member including:
(a) a cylindrical wall,
(b) a radially inwardly extending wall at one end of said cylindrical wall,
(c) a radially inwardly converging truncated conical wall joined to said inwardly extending wall,
(d) a radially outwardly extending reinforcing rib joined at the inner end of said truncated conical wall wherein the edge formed by the inner section of said reinforcing rib and said truncated conical wall defines a circular opening the diameter of which is slightly less than the central portion of the second member; and
(e) means for mounting the sealing member at the second end of said first member including a radially extending circumferential annulus formed on the inner surface of said cylindrical wall of said sealing member and integral therewith, and an annular groove formed near the edge of the second end of said first member, wherein the circumferential annulus fits into and generally complements the annular groove.

2. The driveline assembly of claim 1 wherein said circumferential annulus is generally centered on the inner surface of said cylindrical wall.

3. The driveline assembly of claim 1 wherein said sealing member is made of resilient material.

4. The driveline assembly of claim 1 wherein the thickness of said truncated conical wall varies from its juncture with said radially inwardly extending wall to its juncture with said reinforcing rib.

5. The driveline assembly of claim 4 wherein the thickness of said truncated conical wall decreases from its juncture with said radially inwardly extending wall to its juncture with said reinforcing rib.

* * * * *